United States Patent [19]
Ricci

[11] 3,941,261
[45] Mar. 2, 1976

[54] WHEEL CHAIR CARRYING MINIBUS

[75] Inventor: William S. Ricci, Dorchester, Mass.

[73] Assignee: H. P. Bus Corporation of America, N. Billerica, Mass.

[22] Filed: Oct. 21, 1974

[21] Appl. No.: 516,270

[52] U.S. Cl. .................................. 214/85; 296/25
[51] Int. Cl.² ........................................ B65G 67/02
[58] Field of Search ......... 214/85, 85.1, 75 R, 75 T, 214/75 G; 180/89; 296/23 D, 25

[56] References Cited
UNITED STATES PATENTS

| | | | |
|---|---|---|---|
| 1,428,748 | 9/1922 | Brososky | 296/25 |
| 1,717,303 | 6/1929 | Barclay | 214/85 |
| 3,710,962 | 1/1973 | Fowler, Jr. | 214/75 T |
| 3,847,292 | 11/1974 | Williams | 214/75 G |

Primary Examiner—Albert J. Makay
Attorney, Agent, or Firm—Pearson & Pearson

[57] ABSTRACT

A vehicle of the "Volkswagen" minibus type with sliding side doors and rear engine drive has a tray-like subframe affixed centrally in a cut out portion of the main frame. The subframe has a front wall, a rear wall, one side wall and a planar bottom at a level well below the conventional floor level. A normally upstanding wheel chair ramp is pivoted to the bottom, on a fixed axis at the level thereof, in an opening in the opposite side wall of the rectangular subframe. The track for the side door has a section along the ramp. The lowered floor level brings the eyes of the patient down to window level.

11 Claims, 5 Drawing Figures

WHEEL CHAIR CARRYING MINIBUS

BACKGROUND OF THE INVENTION

It has heretofore been proposed to provide vehicles with ramp means so that a wheel chair, boat, tractor or the like may be wheeled up the ramp onto the floor of the vehicle. Typical of such vehicles is that shown in U.S. Pat. No. 3,193,321 to Rose of July 6, 1965, where the ramp is simply the down swinging rear door of a horse trailer or the like. A similar down swinging rear door to a trailer is disclosed in U.S. Pat. No. 3,711,882 to Iller of Jan. 23, 1973.

However, these are special purpose vehicles and not passenger carrying vehicles of the automobile-bus type.

For such passenger carrying automobiles it has been proposed to provide a ramp for a side door wherein the ramp slides out from under the floor and rests on the door sill as in U.S. Pat. Nos. 1,717,303 and 1,884,513 to Barclay of June 11, 1929 and Oct. 25, 1932 respectively, the vehicles shown having the high rooves of the day and there being no problem of the patient seated in the wheel chair having his head strike the roof or being unable to see out the windows. A side door foldable ramp is disclosed in U.S. Pat. No. 3,651,965 to Simonelli of Mar. 28, 1972, which appears to be an elevator but the floor of the vehicle is at conventional height and the ramp is not fixed pivoted to the side edge of the floor.

In addition to the above, there are patents on vehicles having sliding side doors and lowered floor portions such as U.S. Pat. No. 1,777,966 to Fageol of Oct. 7, 1930, U.S. Pat. No. 2,233,181 to Quartullo of Feb. 25, 1941 and U.S. Pat. No. 2,480,047 to Reinhard of Aug. 23, 1949. However, these patents do not disclose a lowered floor portion between a driver's seat and passenger seats, the driver usually standing on the lowered floor while driving and there are no ramps associated with such vehicles.

SUMMARY OF THE INVENTION

This invention is intended to permit a wheel chair occupant to be driven about in a Volkswagen minibus having sliding side doors, or in a similar vehicle of other manufacture, the wheel chair occupant being able to see out the windows while seated. The windows, driver's seat, passenger seats of the vehicle remain unaffected but the invention contemplates the removal of the central portion of the vehicle frame and the welding insertion therein of a rectangular tray-like subframe. The bottom of the subframe is planar from side to side of the vehicle at a level well below the level of the conventional floor so that a wheel chair occupant will be at the correct height to see the scenery through the vehicle windows.

An integral, one-piece, inverted U-shaped ramp is mounted on a fixed pivot, at the level of the side edge of the bottom, the ramp being normally upstanding but pivotable downwardly so that the free terminal tip is on the ground.

The gear shift control rod is sectionalized with universal joints to extend under the lowered bottom and permit changing of gears. A section of the track for the sliding door is fixed to the outside of the ramp to pivot downwardly therewith but to guide the closing door when the ramp is up. Limit switches and latches prevent the door from closing when the ramp is down and prevent the ramp from lowering inadvertently.

DESCRIPTION OF PREFERRED EMBODIMENT

Figure 1:
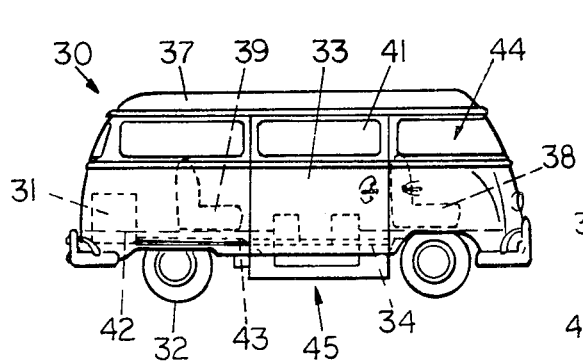
FIG. 1 is a side elevational view of the side door, minibus having the lowered floor and pivoted ramp of the invention, the ramp being shown in dotted lines.
Figure 2:
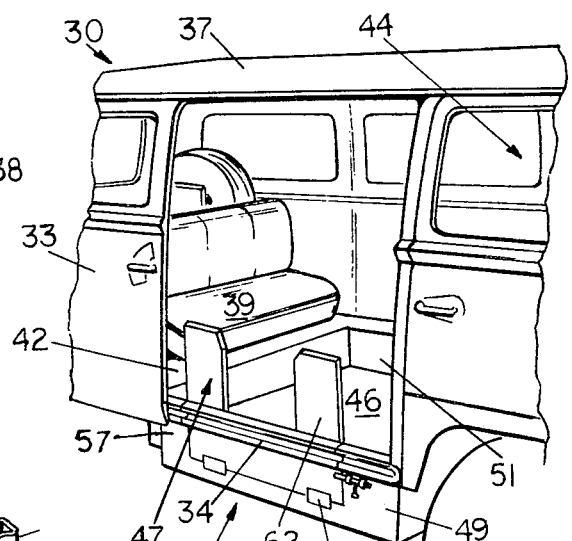
FIG. 2 is an enlarged perspective view showing the minibus of FIG. 1 with the door slid open, the lowered floor and the pivoted ramp in upstanding position.
Figure 3:
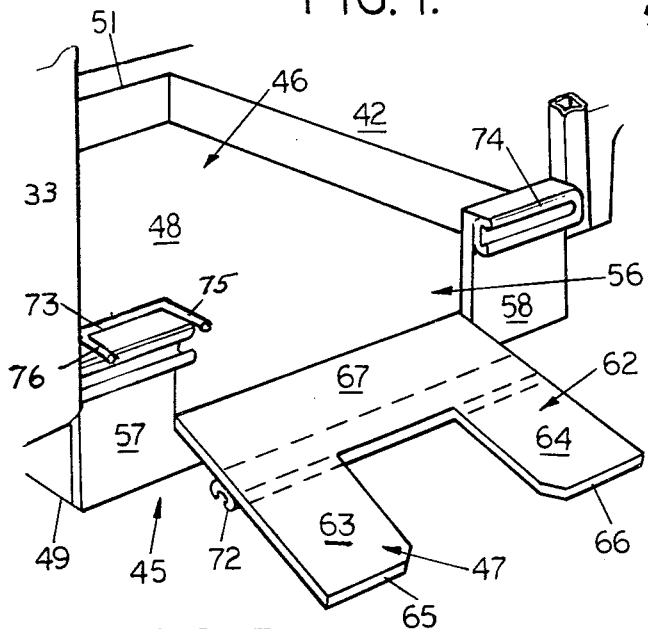
FIG. 3 is a fragmentary detail perspective view showing the ramp pivoted downwardly in inclined position.
Figure 4:
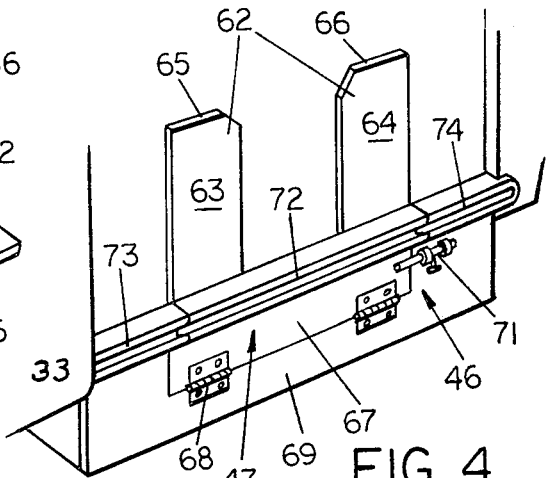
FIG. 4 is a fragmentary perspective view showing the ramp up and latched and showing the door track sectionalized.

As shown in the drawings, a typical "Volkswagen" minibus 30 includes a rear engine 31, rear driven wheels 32, a side door 33 slideable in a lower track 34 longitudinally 34, frame pieces 35 and 36 and a roof 37. The driver's seat 38, passenger seats 39, windows 41 and floor 42 are at conventional levels which allow a person sitting in the seats with feet on the floor to be able to see out of the windows. There is no drive shaft mound in the floor 42 but an elongated gear shift control rod 43 runs from the driver's compartment 44 horizontally under floor 42 to the gear box of the engine 31.

Wheel chair support means 45 is provided consisting of lowered floor means 46 and wheel chair ramp means 47.

Lowered floor means 46 is located centrally of the vehicle 30, between the conventional driver's seat 38, and driver's compartment 44, and the conventional passenger seats 39. It includes a horizontal planar bottom or subfloor, 48 extending from side 49 to side 51 of the vehicle at a predetermined level well below the level of conventional floor 42.

Figure 5:
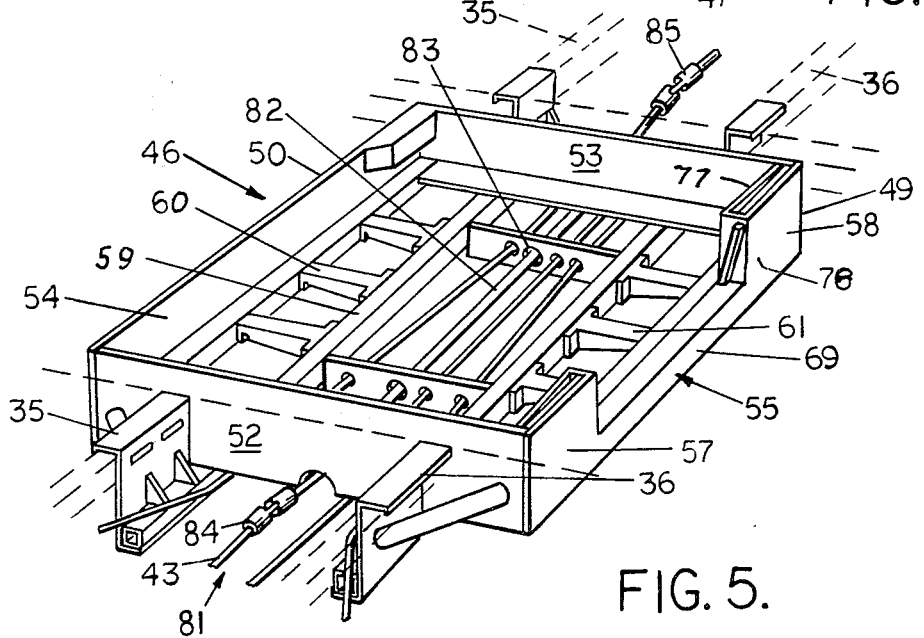
FIG. 5 is a fragmentary detail view with parts broken away, showing the tray-like rectangular subframe of the lowered floor means affixed to the main frame of the vehicle.

Preferably lowered floor means 46 is of shallow rectangular tray-like configuration with four vertical side walls consisting of forward wall 52 rearward wall 53, side wall 54 and side wall 55 (FIG. 5). Side wall 55 has an opening 56, forming a space between sections 57 and 58, the opening 56 receiving the inner portion of ramp means 47.

The lowered floor means 46 also includes a subframe 61 comprising a plurality of laterally and longitudinally extending cross braces such as 59 and 60, at a level below the level of bottom 48 which is supported thereon. Means 46 is welded, or otherwise affixed to the main frame pieces 35 and 36 to retain the integrity of the frame while permitting the bottom 48 to be at the lower level.

The ramp means 47 comprises a unitary one-piece bifurcated ramp 62, of inverted U-shaped configuration having a pair of legs 63 and 64 with free terminal ends 65 and 66 and a connecting bight 67. The bifurcated ramp 62 is mounted on a fixed pivot 68 to the web 69 along the opening 56 substantially at the level of bottom 48. Ramp 62 is normally in upstanding position, held by latch means 71 and preferably includes a track section 72 on the outside thereof which pivots downwardly with the ramp, but connects with track sections 73 and 74 to permit the side door 33 to slide to closed position covering the ramp.

Preferably a safety element 76 is provided in the path of closing of door 33, for holding the door in retracted, open position when ramp 62 is down. The raising of the ramp to normally upstanding position actuates a member 75 in the path of the ramp to remove the element 76 from the path of the door, to permit it to close against spring pressure, to pivot latch 76 out of the path of the door.

Preferably also the sections 57 and 58 of wall 55 are double walled as at 77 and 78 to lend additional strength in view of the opening 56 in the wall.

Gear shift control rod means 81 is also provided including a horizontal rod section 82 extending below the bottom 48 and preferably through apertures 83 in the subframe 61. There are a pair of universal jointed rod sections 84 and 85, one at each end of section 82 for connecting the driver's compartment to the gear box of engine 31.

It will be understood that this invention may be applied to a Volkswagen minibus, even if the vehicle is later manufactured with the engine in front and either a front wheel or a rear wheel drive. If such a vehicle then includes a longitudinal drive shaft, the drive shaft may be lowered in the same manner as in the Fageol U.S. Pat. No. 1,177,966, or by the use of a pair of universal joints as in the control rod herein. Similarly a conventional automotive bus or van, having side windows may be constructed in accordance with this invention by providing lowered floor means with a substantially planar bottom and an upstanding ramp mounted on a pivot at the level of the lowered bottom to pivot downwardly in a door opening.

I claim:

1. In a vehicle of the "Volkswagen minibus" type having at least one side door slideable in a lower track, and conventional height seats, windows and floor the combination of:
 wheel chair support means on said vehicle, said means comprising:
  lowered floor means, located between the conventional driver's seat and the conventional passenger seats within said vehicle, said lowered floor means including a side wall, an opposite side wall with a ramp opening and a planar bottom, said bottom extending from side to side of said vehicle at a predetermined level below the level of said conventional floor and
  wheel chair ramp means, including a normally upstanding wheel chair ramp mounted on a fixed pivot located substantially at the lowered level of said planar bottom in the ramp opening in said side wall, for pivoting downwardly when the adjacent side door is slideably opened to an inclined position to support a wheel chair,
 said wheel chair being supported at the level of said lowered bottom when wheeled up said ramp onto said bottom in order that the eyes of the occupant thereof will be at the level of the windows of said vehicle.

2. A vehicle as specified in claim 1 where said lowered floor means includes a substantially vertical forward, rearward and one side wall connected to said conventional floor, but the other side wall includes a pair of spaced substantially vertical sections defining said ramp opening with the lower portion of said ramp occupying said ramp opening.

3. A vehicle as specified in claim 2 wherein: the said spaced upstanding sections are double walled with a double walled connecting web extending across the lower portion of the space therebetween to which said ramp is pivoted.

4. A vehicle as specified in claim 1 wherein: said ramp is bifurcated with a pair of opposite ramp legs, each adapted to support a wheel of a wheel chair, and an integral connecting portion proximate the pivoted end thereof and includes latch means on said lowered floor means, cooperable with said connecting portion for holding said ramp in normally upstanding position.

5. A vehicle as specified in claim 1 wherein: said lowerd floor means is of shallow rectangular tray-like configuration with three vertical walls and a fourth vertical wall cut away to accomodate said ramp
 and includes a plurality of longitudinally and laterally extending cross braces, below the level of said bottom, for forming a subframe with said walls, integrally affixed to the main frame of said vehicle.

6. A vehicle as specified in claim 1 wherein: said lowered floor means is free of brackets, seats or other obstructions above the level of said planar bottom and includes a rectangular, shallow, tray-like subframe including lateral and longitudinal cross members, below the level of said planar bottom said subframe being welded to the main frame of said vehicle to replace portions removed therefrom to receive said floor means.

7. A vehicle as specified in claim 1 plus gear shift control rod means extending under said bottom, including a rod section extending longitudinally of said planar bottom and a pair of universal jointed rod sections, each at an opposite end of said rod section for enabling control of the gear box of said vehicle from the driver's area thereof.

8. A vehicle as specified in claim 6 plus: gear shift control rod means including a rod section extending longitudinally under said bottom, and through apertures in said subframe, and a pair of universal jointed rod sections connecting said rod section with said connecting gear shift control rod.

9. A vehicle as specified in claim 1 wherein: said lowered floor means and said ramp means support said lower track, said lower track having a section thereof fixed to the outside of said ramp to pivot downwardly therewith, said section guiding said side door when said ramp is up and said door is being closed.

10. A vehicle as specified in claim 1 plus safety means in the path of movement of the ramp operable to control the opening and closing of the vehicle door,
 whereby said door cannot close if the ramp is down.

11. In a vehicle of the Volkswagen minibus type having engine in rear, rear wheel drive, sliding side doors with tracks therefor, conventional height seats and floor and controls extending under said floor to said engine and rear wheels the combination of:
 wheel chair support means, said means comprising:
  a lowered floor means, located between the driver's seat and the passenger seats of said vehicle, said means having a planar bottom, below the level of said conventional floor and extending from side to side of said vehicle, gear shift control rod means, extending under said bottom, including a pair of universal joint sections and a horizontal section therebetween;

and ramp means, including a wheel chair ramp mounted on a fixed pivot substantially at the level of said bottom and normally extending upwardly therefrom, said ramp having a section of one of said sliding door tracks thereon, whereby said sliding door may be closed along said track section when said ramp is in normal upward position and said ramp may be lowered for supporting a wheel chair when said sliding door is in open position.

* * * * *